United States Patent [19]

Gotoh et al.

[11] Patent Number: 4,784,772
[45] Date of Patent: Nov. 15, 1988

[54] METHOD FOR THE PRODUCTION AND USE OF ULTRAPURE WATER AND APPARATUS THEREFOR

[75] Inventors: Yoshihisa Gotoh; Toshihiko Tutumi, both of Yokohama; Toshiaki Takahashi, Hatano; Katsuhiko Ito, Kawasaki, all of Japan

[73] Assignee: Mitsui Toatsu Chemicals, Incorporated, Tokyo, Japan

[21] Appl. No.: 62,675

[22] Filed: Jun. 16, 1987

[30] Foreign Application Priority Data

Jun. 17, 1986 [JP] Japan .................... 61-139206
May 13, 1987 [JP] Japan .................... 62-114539

[51] Int. Cl.$^4$ ............................................ C02F 9/00
[52] U.S. Cl. .................... 210/638; 210/668; 210/259; 210/266; 210/900
[58] Field of Search .............. 138/103, 178, DIG. 6, 138/DIG. 7; 210/638, 663, 668, 669, 685, 686, 694, 259, 257.2, 266, 321.1, 900

[56] References Cited

U.S. PATENT DOCUMENTS

3,870,033  3/1975  Faylor et al. .................... 210/900
4,665,305  5/1987  Shirazawa et al. .................... 166/60

Primary Examiner—Ivars Cintins
Attorney, Agent, or Firm—Fisher, Christen & Sabol

[57] ABSTRACT

Ultrapure water are produced and used by subjecting deionized water, which has been obtained from a deionization step making use of an ion-exchange resin, successively to a sterilization treatment, an activated carbon treatment, an ion-exchange resin treatment and a permeable membrane treatment. The water is fed from each of the steps of the treatments after at least the sterilization tretment (inclusive) to the next step through first piping made of a crystalline polyether ether ketone resin having a recurring unit of the following formula:

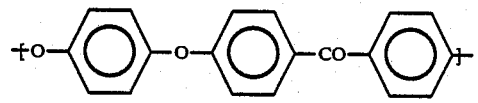

The thus-produced ultrapure water is then fed through second piping, which is also made of the crystalline polyether ether ketone resin, to and through a use system of the ultrapure water.

5 Claims, No Drawings

METHOD FOR THE PRODUCTION AND USE OF ULTRAPURE WATER AND APPARATUS THEREFOR

BACKGROUND OF THE INVENTION (1) Field of the Invention

This invention relates to an improved method for the production and use of ultrapure water, which is useful in fields such as fabrication of semiconductors, and also to an apparatus therefor.

(2) Description of the Prior Art

Ultrapure water, which is employed in fields such as fabrication of semiconductors, is now required to have still higher purity as the integration of semiconductors advances further. Ultrapure water is generally produced by processing raw water through a series of treatment steps which include a treatment step by a permeable membrane such as reverse osmosis membrane, a deionization step making use of an ion-exchange resin, a sterilization step by ultraviolet rays, an activated carbon treatment step, a treatment step by regenerable ion-exchange resins packed in the form of a mixed bed and a treatment step by a permeable membrane. The thus-produced ultrapure water is fed to a use site and its unused portion is recycled to a point either before or after the deionization step.

As various piping arranged between apparatus for practising the respective steps in the above production process and in a use system of ultrapure water, there are widely used pipes made of plastics such as hard vinyl chloride resin, polyvinylidene fluoride resin (hereinafter abbreviated as "PVDF") or tetrafluoroethylene-fluoroalkyl vinyl ether copolymer resins (hereinafter abbreviated as "PFA").

Use of these plastic pipes cannot however meet the above-mentioned demand for still further purification of ultrapure water, because organic substances are dissolved out and the growth of bacteria is promoted. In order to solve this problem, ultrapure water in a use system which follows the permeable membrane treatment step must be heated to 80°–100° C. or in some instances, even up to 120° C. for its sterilization. The heat resistance and hot water resistance of conventional plastic pipes were too low to perform the above heat sterilization, so that a variety of problems arose. Included in such problems were deformation of hard PVC pipes, discoloration of PVDF pipes and deformation and embrittlement of PFA pipes.

SUMMARY OF THE INVENTION

An object of this invention is therefore to provide an improved method for the production and use of ultrapure water, which method can meet the outstanding demand for further purification of ultrapure water to be used upon fabrication of semiconductors. As mentioned above, the demand for the further purification of ultrapure water has arisen reflecting the trend toward higher integration of semiconductors.

Another object of this invention is to provide an apparatus suitable for use in the practice of the above method.

This invention provides the following method for the production and use of ultrapure water:

In a method for the production and use of ultrapure water by subjecting deionized water, which has been obtained from a deionization step making use of an ion-exchange resin, successively to a sterilization treatment, an activated carbon treatment, an ion-exchange resin treatment and a permeable membrane treatment, the improvement wherein the water is fed from each of the steps of the treatments after at least the sterilization treatment (inclusive) to the next step through first piping made of a crystalline polyether ether ketone resin having a recurring unit of the following formula:

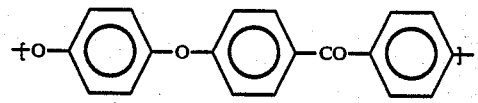

and the thus-produced ultrapure water is then fed through second piping, which is made of the crystalline polyether ether ketone resin, to and through a use system of the ultrapure water.

DETAILED DESCRIPTION OF THE INVENTION

The above polyether ether ketone resin (hereinafter abbreviated as "PEEK") may preferably have a melt flow index of 1–5kg/10 min as measured at 360° C. under a load of 2.16 kg in accordance with ASTM D1238. It should be noted that small amounts of fillers and fibrous reinforcing materials such as glass fibers, carbon fibers and potassium titanate fibers may be incorporated in PEEK to extents not impairing the objects of this invention. Conventional methods such as injection molding, extrusion molding and transfer molding can be used to mold PEEK into pipes.

The individual steps in the method of this invention are known per se in the art. The deionization step is effected by causing raw water to pass through a column of a cation-exchange resin and another column of an anion-exchange resin, or a column of ion-exchange resins packed in the form of a mixed bed. It may be possible to purify raw water by means of a treatment apparatus making use of a permeable membrane, such as reverse osmosis apparatus, or an activated carbon absorption column prior to the deionization step, to store the thus-obtained purified water in a purified water tank and then to feed the purified water from the purified water tank to the deionization step. As an alternative, purified water from the deionization step may be stored once and then fed to the subsequent step.

The deionized water from the deionization step is thereafter passed through a sterilization apparatus, in which the deionized water is exposed to ultraviolet rays from an ultraviolet germicidal lamp so as to control the viable microbe cell number in the water to 1 cell per 100 ml or less. The purified water, which has flowed out of the sterilization apparatus, is optionally passed through a treatment apparatus equipped with a permeable membrane, and is thereafter caused to flow through an absorption column with activated carbon packed therein, a column of regenerable ion-exchange resins packed in the form of a mixed bed, and a final permeable membrane treatment apparatus making use of an ultrafiltration membrane or reverse osmosis membrane, whereby the purified water is purified further into ultrapure water.

The thus-obtained ultrapure water is then fed to a use site through piping. Unused portion of the ultrapure water is recycled to the purified water tank. PEEK pipes are used for the piping after at least the deionization step (inclusive) and also for the piping of the use system.

The use system subsequent to the final permeable membrane treatment step is preferably maintained at a temperature of 80°–100° C. so as to subject the ultrapure water to heat sterilization. This temperature may be raised up to 120° C. in some instances.

The apparatus of this invention for the production and use of ultrapure water is constructed by connecting the respective apparatus after at least the sterilization apparatus (inclusive) with PEEK pipes and PEEK fittings and forming the piping of the use system with such PEEK pipes and fittings.

PEEK pipes and fittings useful in the practice of this invention have high mechanical strength and excellent resistance to heat, chemicals and hot water. In addition, organic substances are dissolved out in smaller amounts compared with hard PVC pipes. Use of such PEEK pipes and fittings can therefore reduce the growth of microorganisms compared with the use of hard PVC pipes and at the same time, can avoid the problems of deformation, crack development, embrittlement and the like pipes which arise unavoidably upon hot sterilization due to the insufficient heat and hot water resistance of such hard PVC pipes. PEEK pipes and fittings can therefore meet the demand for further purification of ultrapure water.

The present invention will hereinafter be described specifically by the following Examples and Comparative Examples.

EXAMPLE 1

By a pipe extruder, "PEEK 450G" (trade name for polyether ether ketone produced by ICI Limited, U.K.; melt index: 2.8 g/10 min) was molded at a cylinder temperature of 390° C. into a pipe having an outer diameter of 32 mm and a wall thickness of 3 mm.

Two 5-cm long pipe sections were cut off from the thus-obtained pipe. Those pipe sections were washed successively with trichlene, methanol and purified water. One of the pipe sections was then immersed in purified water of 23° C. and the other pipe section was dipped in purified water of 60° C. After allowing them to stand for 7 days in their respective purified waters, the total organic carbon concentrations (hereinafter abbreviated as "TOC") of the respective purified waters in which the corresponding pipe sections had been immersed were measured by using a "TOTAL ORGANIC CARBONANALYZER, MODEL TOC 500" (trade mark) manufactured by Shimadzu Corp., Japan. TOCs were 3.2 ppm and 5.0 ppm respectively. In an autoclave, a further pipe section of 5 cm long which had been cut off in the same manner as described above was immersed for 7 days in purified water of 120° C. Its surface conditions were then inspected. Cracks, fractures or like damages were not observed.

COMPARATIVE EXAMPLE 1

A pipe made of hard polyvinyl chloride and having an outer diameter of 32 mm and a wall thickness of 3 mm was used. Pipe sections were immersed in purified water of 23° C. and purified water of 60° C. respectively in the same manner as in Example 1. TOCs were found to be 3.2 ppm and 14.0 ppm respectively.

In an autoclave, a further pipe section of the hard PVC pipe was also immersed in purified water of 120° C. in the same manner as in Example 1. The pipe section was deformed so much that it was no longer usable.

COMPARATIVE EXAMPLE 2

A PVDF pipe having an outer diameter of 32 mm and a wall thickness of 3 mm was used. Pipe sections were immersed in purified water of 23° C. and purified water of 60° C. respectively in the same manner as in Example 1. TOCs were found to be 3.0 ppm and 9.0 ppm respectively.

In an autoclave, a further pipe section of the PVDF pipe was also immersed in purified water of 120° C. in the same manner as in Example 1. The pipe section was deformed so much that it was no longer usable.

COMPARATIVE EXAMPLE 3

A PFA pipe having an outer diameter of 32 mm and a wall thickness of 3 mm was used. Pipe sections were immersed in purified water of 23° C. and purified water of 60° C. respectively in the same manner as in Example 1. TOCs were found to be 3.0 ppm and 5.0 ppm respectively.

In an autoclave, a further pipe section of the PFA pipe was also immersed in purified water of 120° C. in the same manner as in Example 1. The pipe section was deformed so much that it was no longer usable.

EXAMPLE 2

An ultrapure water production apparatus was constructed by successively connecting a reverse osmosis apparatus, a purified water tank, a column of ion-exchange resins packed in the form of a mixed bed, an ultraviolet sterilization apparatus, an activated carbon absorption column, a column of ion-exchange resins packed in the form of a mixed bed and an ultrafiltration apparatus by pipes and fittings which were both made of "PEEK 450G" (trade name; product of ICI Limited; melt index: 2.8 g/10 min). Tap water was fed to the ultrapure water production apparatus. Ultrapure water was produced at a rate of 500 l/hr, while operating at 90° C. the system after the ultrafiltration apparatus (inclusive). Analysis data of the thus-obtained ultrapure water are summarized in Table 1.

TABLE 1

| | |
|---|---|
| Resistivity (MΩ · cm, 25° C.) | $10^{17}$ |
| Fine particles (0.1 μm and up, particles/ml) | 40 |
| Viable cells (cells/100 ml) | 1 |
| TOC (ppb) | 50 |
| Silica (μg SiO$_2$/l) | 7 |

After conducting the operation for 1 week, continuously, the piping in the high-temperature system was inspected visually. No changes were however observed at all. In addition, it was practically possible to maintain the above purity.

COMPARATIVE EXAMPLE 4

Ultrapure water was produced in the same manner as in Example 2 except that the piping of the production apparatus was changed to hard PVC piping. After a continuous 1-week operation, the piping of the high-temperature system was inspected visually. Cracks were observed in the inner walls of pipes.

We claim:

1. In a method for the production and use of ultrapure water produced by subjecting deionized water, which has been obtained from a deionization step to a process comprising thepurification steps of a sterilization treatment, an activated carbon treatment, an ion-exchange resin treatment and a permeable membrane treatment, the improvement comprising feeding the water from each of the treatment steps after at least the sterilization treatment to the next step through first piping made of a crystalline polyether ether ketone resin having a recurring unit of the following formula:

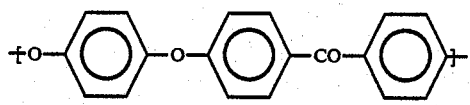

and the thus-produced ultrapure water is then fed through second piping, which is made of said crystalline polyether ether ketone resin, to and through a use system of the ultrapure water.

2. The method as claimed in claim 1, wherein raw water is treated through a reverse osmosis membrane prior to the dionization step.

3. The method as claimed in claim 1, wherein the polyether ether ketone resin has a melt flow index of 1-5 kg/10 min as measured at 360° C. under a load of 2.16 kg.

4. In an apparatus for the production and use of ultrapure water, comprising a deionization means, an ultraviolet sterilization means, an activated carbon absorption means, an ion-exchange means and a permeable membrane treatment means and a use system, the improvement comprising wherein first piping connecting each means after at least said sterilization means to the next means and second piping of a use system of the ultrapure water are each composed of pipes and fittings made of a crystalline polyether ether ketone resin having a recurring unit of the following formula:

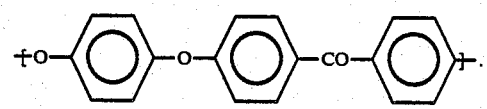

5. The apparatus as claimed in claim 4, further comprising a reverse osmosis treatment means prior to the deionization means.

* * * * *